United States Patent
Lee et al.

(10) Patent No.: US 10,791,574 B2
(45) Date of Patent: Sep. 29, 2020

(54) RANDOM ACCESS PROCEDURE WITH BEAM SWEEPING

(71) Applicant: LG ELECTRONICS INC., Seoul (KR)

(72) Inventors: Sunyoung Lee, Seoul (KR); Seungmin Lee, Seoul (KR); Daesung Hwang, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/707,825

(22) Filed: Sep. 18, 2017

(65) Prior Publication Data

US 2018/0084585 A1 Mar. 22, 2018

Related U.S. Application Data

(60) Provisional application No. 62/396,790, filed on Sep. 19, 2016.

(51) Int. Cl.
| | |
|---|---|
| *H04W 4/00* | (2018.01) |
| *H04W 74/08* | (2009.01) |
| *H04B 7/06* | (2006.01) |
| *H04W 48/20* | (2009.01) |
| *H04W 72/08* | (2009.01) |
| *H04W 16/28* | (2009.01) |
| *H04B 7/0408* | (2017.01) |
| *H04W 72/04* | (2009.01) |
| *H04W 76/27* | (2018.01) |

(52) U.S. Cl.
CPC ...... *H04W 74/0833* (2013.01); *H04B 7/0695* (2013.01); *H04W 16/28* (2013.01); *H04W 48/20* (2013.01); *H04W 72/085* (2013.01); *H04B 7/0408* (2013.01); *H04W 72/0406* (2013.01); *H04W 76/27* (2018.02)

(58) Field of Classification Search
CPC ............. H04W 74/0833; H04W 48/20; H04W 72/085; H04W 16/28; H04W 76/27; H04W 72/0406; H04B 7/0695; H04B 7/0408
USPC ........................................................ 370/329
See application file for complete search history.

(56) References Cited

U.S. PATENT DOCUMENTS

| | | | |
|---|---|---|---|
| 10,051,484 B2 * | 8/2018 | Shen | H04W 16/28 |
| 2019/0052338 A1 * | 2/2019 | Nader | H04W 4/80 |

* cited by examiner

*Primary Examiner* — Huy C Ho
(74) *Attorney, Agent, or Firm* — Lee Hong Degerman Kang Waimey

(57) ABSTRACT

A method and apparatus for a user equipment (UE) performing random access to a network is disclosed. For this end, the UE determines a predetermined number of beams, as candidate beams for the random access to the network, among multiple beams, wherein each of the multiple beams is allocated on different time domain units. And, the UE transmits the random access preamble over a transmission beam selected as one from the candidate beams to the network.

8 Claims, 8 Drawing Sheets

(a) Control-Plane Protocol Stack (b) User-Plane Protocol Stack

RANDOM ACCESS PROCEDURE WITH BEAM SWEEPING

CROSS REFERENCE TO RELATED APPLICATIONS

Pursuant to 35 U.S.C. § 119(e), this application claims the benefit of U.S. Provisional Patent Application No. 62/396,790, filed on Sep. 19, 2016, the contents of which are hereby incorporated by reference herein in its entirety.

BACKGROUND OF THE INVENTION

Field of the Invention

The present invention relates to a wireless communication system supporting beam sweeping scheme. More specifically, the present invention related to a method and apparatus for performing random access to the network with regards to the beam sweeping scheme.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be referred to as eNB, gNB etc. However, in the following explanation, the term 'UE' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

In the development to a New Radio Access Technology (NR), NR system should be able to use frequency bands up to 100 GHz. To compensate the increased path loss of higher frequency bands, the need for beam forming was identified. In addition, to cover the narrowness due to the beam forming, 'beam sweeping' technology has been introduced. For the beam sweeping, NR BS/UE may repeat the same signal over predetermined number of time units to cover the whole range.

In use of Beam sweeping for transmitting/receiving common control information, there would be some inevitable costs as follows:

In DL, an overhead will be increased because the gNB needs to repeat the same information in every beam.

In UL, a latency will be increased if the UE transmits data by using only one beam because the beam changes in time domain and the UE may need to wait for the next chance of the beam for transmission of common control information. On the other hand, the signaling overhead will be increased and/or collision probability may be increased if the UE repeats transmitting data on every beam in order to reduce the latency.

For example using beam sweeping in RACH would have an impact on RA procedure in terms of latency because the next opportunity to transmit RA preamble comes only after a certain time duration is passed.

On the other hand, transmitting RAP in every beam would increase signaling overhead from the UE point of view while it may also increase the collision probability of the RAP transmission between the UEs.

Considering that RA procedure is an essential procedure for all UEs when establishing an RRC Connection or scheduling, increased latency and collision probability are not desirable. Therefore, a new method is required in supporting RA procedure with beam sweeping.

SUMMARY OF THE INVENTION

To achieve these objects and other advantages and in accordance with the purpose of the invention, as embodied and broadly described herein, a method for a user equipment (UE) performing random access to a network, the method comprising: determining a predetermined number of beams, as candidate beams for the random access to the network, among multiple beams, wherein each of the multiple beams is allocated on different time domain units; and transmitting the random access preamble over a transmission beam selected as one from the candidate beams to the network, is proposed.

The candidate beams can be selected based on beam quality.

The UE may select the transmission beam as an earliest available candidate beam in a time domain after the random access is triggered.

But, the UE can randomly select the transmission beam among the candidate beams.

If a first random access procedure initiated by transmitting the random access preamble fails, the UE may reselect another transmission beam from the candidate beams.

The UE can reselect the another transmission beam as an earliest available candidate beam in time domain after a retransmission of the random access is triggered.

Here, each of the multiple beams can be allocated on the different time domain units for a beam sweeping.

In another aspect of the present invention, a user equipment (UE) performing random access to a network, the UE comprising: a processor configured to determine a predetermined number of beams, as candidate beams for the random access to the network, among multiple beams, wherein each of the multiple beams is allocated on different time domain units, and to select a transmission beam as one from the candidate beams; and a transceiver connected to the processor and configured to transmit the random access preamble over the transmission beam to the network, is proposed.

The processor can select the candidate beams based on beam quality.

The processor can select the transmission beam as an earliest available candidate beam in a time domain after the random access is triggered.

But, the processor can randomly select the transmission beam among the candidate beams.

If a first random access procedure initiated by transmitting the random access preamble fails, the processor may reselect another transmission beam from the candidate beams.

The processor may reselect the another transmission beam as an earliest available candidate beam in time domain after a retransmission of the random access is triggered.

Here, each of the multiple beams is allocated on the different time domain units for a beam sweeping.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description relates to a wireless communication system supporting random access procedure (RAP). So, the details of the RAP is explained first.

Figure 1:
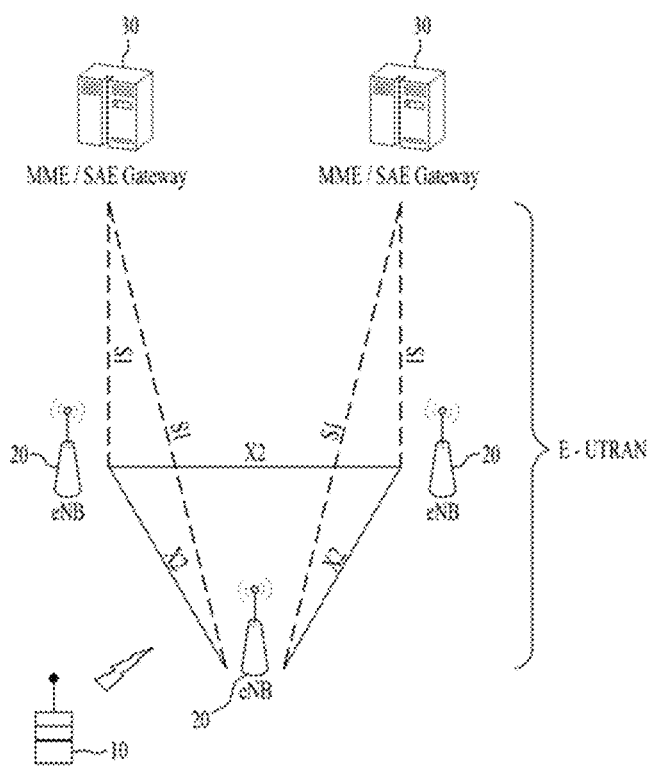
FIG. 1 is a block diagram illustrating network structure of an evolved universal mobile telecommunication system (E-UMTS)
Figure 2:
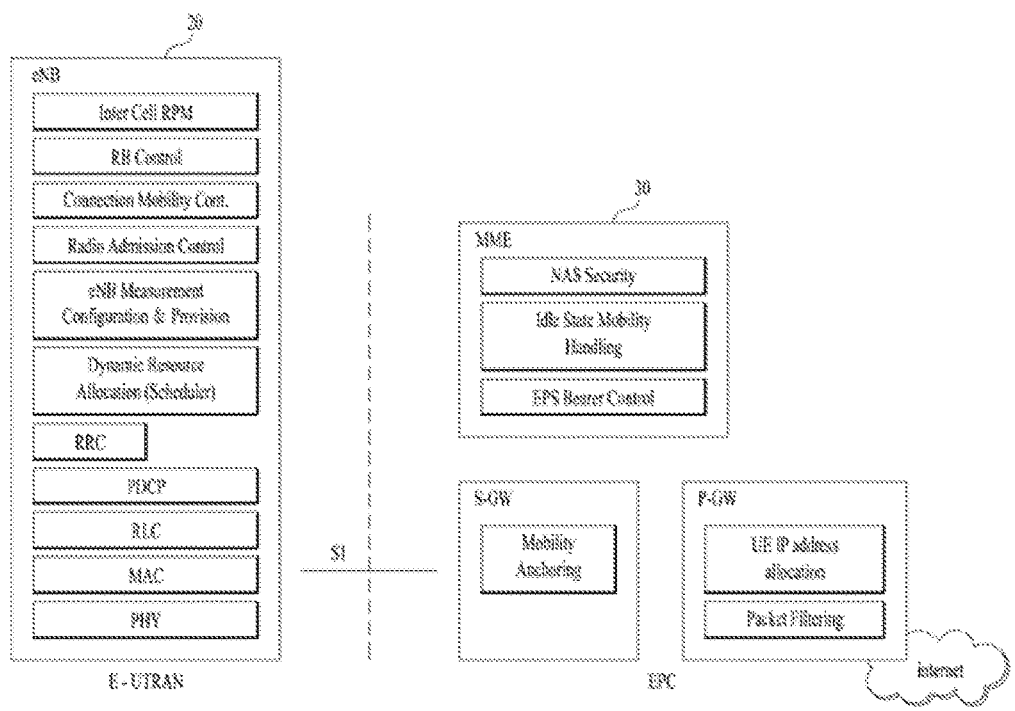
FIG. 2 is a block diagram depicting architecture of a typical E-UTRAN and a typical EPC.
Figure 3:
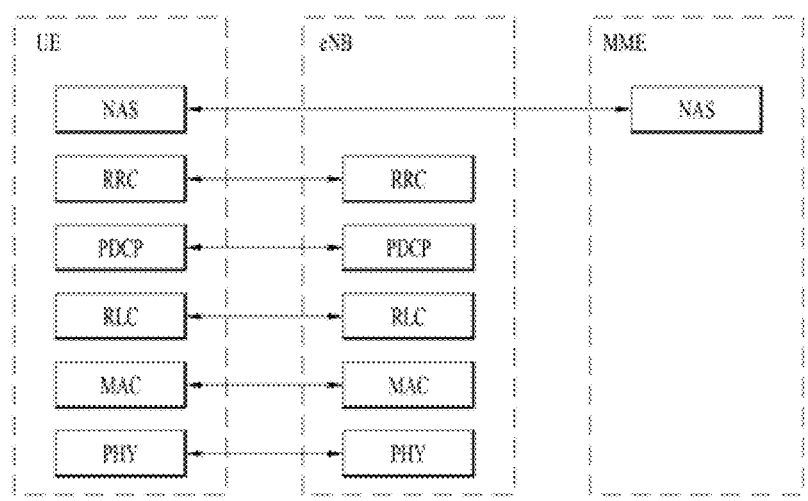
FIG. 3 is a diagram showing a control plane and a user plane of a radio interface protocol between a UE and an E-UTRAN based on a 3GPP radio access network standard.
Figure 3:
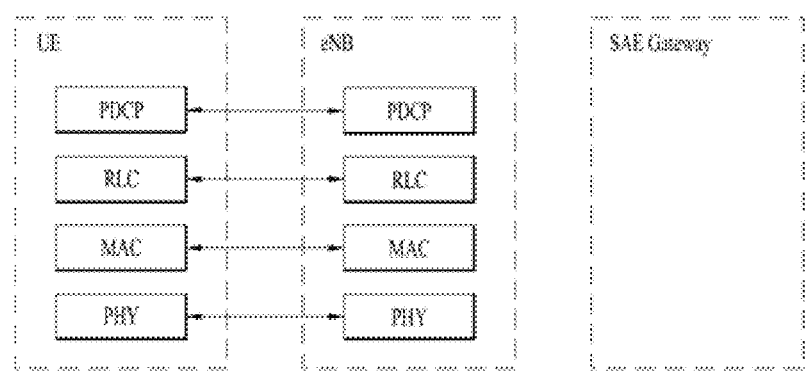
Figure 4:
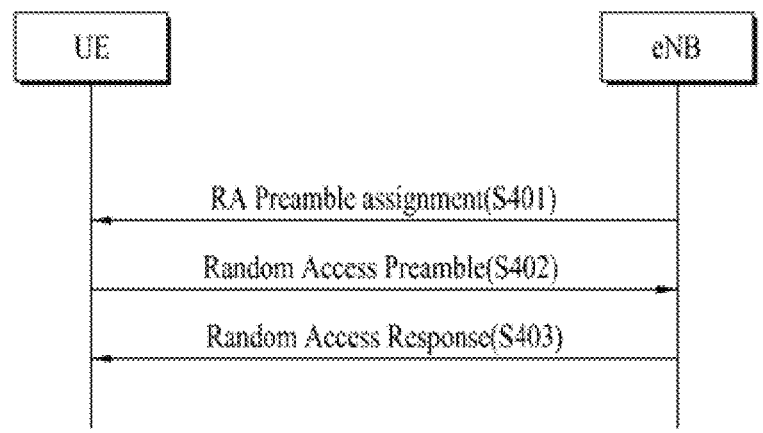
FIG. 4 is a diagram illustrating an operation procedure of a user equipment and a base station during a non-contention based random access procedure.

FIG. 4 is a diagram illustrating an operation procedure of a user equipment and a base station during a non-contention based random access procedure.

(1) Random Access Preamble Assignment

The non-contention based random access procedure can be performed for two cases, i.e., (1) when a handover procedure is performed, and (2) when requested by a command of the base station. Of course, the contention based random access procedure may also be performed for the two cases.

First of all, for non-contention based random access procedure, it is important that the user equipment receives a designated random access preamble having no possibility of contention from the base station. Examples of a method of receiving a random access preamble include a method through a handover command and a method through a PDCCH command. A random access preamble is assigned to the user equipment through the method of receiving a random access preamble (S401).

(2) First Message Transmission

As described above, after receiving a random access preamble designated only for the user equipment, the user equipment transmits the preamble to the base station (S402).

(3) Second Message Reception

After the user equipment transmits the random access preamble in step S402, the base station tries to receive its random access response within a random access response receiving window indicated through system information or handover command (S403). In more detail, the random access response can be transmitted in the form of a MAC protocol data unit (MAC PDU), and the MAC PDU can be transferred through a physical downlink shared channel (PDSCH). Also, it is preferable that the user equipment monitors a physical downlink control channel (PDCCH) to appropriately receive information transferred to the PDSCH. Namely, it is preferable that the PDCCH includes information of a user equipment which should receive the PDSCH, frequency and time information of radio resources of the PDSCH, and a transport format of the PDSCH. If the user equipment successfully receives the PDCCH transmitted thereto, the user equipment can appropriately receive a random access response transmitted to the PDSCH in accordance with the information of the PDCCH. The random access response can include a random access preamble identifier (ID) (for example, random access preamble identifier (RA-RNTI)), uplink grant indicating uplink radio resources, a temporary C-RNTI, and timing advance command (TAC) values.

As described above, the random access preamble identifier is required for the random access response to indicate whether the uplink grant, the temporary C-RNTI and the TAC values are effective for what user equipment as random access response information for one or more user equipment can be included in one random access response. In this case, it is assumed that the user equipment selects a random access preamble identifier corresponding to the random access preamble selected in step S402.

In the non-contention based random access procedure, the user equipment can terminate the random access procedure after determining that the random access procedure has been normally performed by receiving the random access response information.

Figure 5:
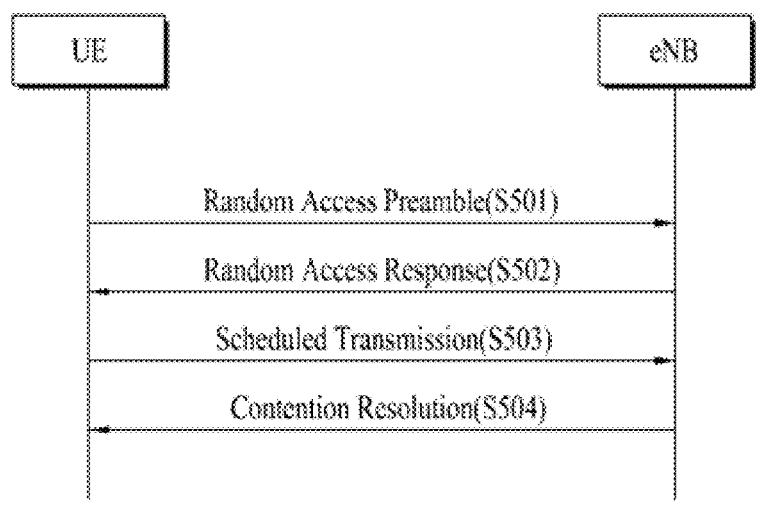
FIG. 5 is a diagram illustrating an operation procedure of a user equipment and a base station during a contention based random access procedure.

FIG. 5 is a diagram illustrating an operation procedure of a user equipment and a base station during a contention based random access procedure.

(1) First Message Transmission

First of all, the user equipment randomly selects one random access preamble from a set of random access preambles indicated through system information or handover command, and selects a physical RACH (PRACH) resource that can transmit the random access preamble (S501).

(2) Second Message Reception

A method of receiving random access response information is similar to that of the aforementioned non-contention based random access procedure. Namely, after the user equipment transmits the random access preamble in step S402, the base station tries to receive its random access response within a random access response receiving window indicated through system information or handover command, and receives the PDSCH through corresponding random access identifier information (S502). In this case, the base station can receive uplink grant, a temporary C-RNTI, and timing advance command (TAC) values.

(3) Third Message Transmission

If the user equipment receives its effective random access response, the user equipment respective processes information included in the random access response. Namely, the user equipment applies TAC and store a temporary C-RNTI. Also, the user equipment transmits data (i.e., third message) to the base station using UL grant (S503). The third message should include a user equipment identifier. This is because that the base station needs to identify user equipment which perform the contention based random access procedure, thereby avoiding contention later.

Two methods have been discussed to include the user equipment identifier in the third message. In the first method, if the user equipment has an effective cell identifier previously assigned from a corresponding cell before the random access procedure, the user equipment transmits its cell identifier through an uplink transport signal corresponding to the UL grant. On the other hand, if the user equipment does not have an effective cell identifier previously assigned from a corresponding cell before the random access procedure, the user equipment transmits its cell identifier including its unique identifier (for example, S-TMSI or random ID). Generally, the unique identifier is longer than the cell identifier. If the user equipment transmits data corresponding to the UL grant, the user equipment starts a contention resolution timer.

(4) Fourth Message Reception

After transmitting data including its identifier through UL grant included in the random access response, the user equipment waits for a command of the base station for contention resolution. Namely, the user equipment tries to receive the PDCCH to receive a specific message (504). Two methods have been discussed to receive the PDCCH. As described above, if the third message is transmitted to correspond to the UL grant using the user equipment identifier, the user equipment tries to receive the PDCCH using its cell identifier. If the user equipment identifier is a unique identifier of the user equipment, the user equipment tries to receive the PDCCH using a temporary cell identifier included in the random access response. Afterwards, in case of the first method, if the user equipment receives the PDCCH through its cell identifier before the contention resolution timer expires, the user equipment determines that the random access procedure has been performed normally, and ends the random access procedure. In case of the second method, if the user equipment receives the PDCCH through the temporary cell identifier before the contention resolution timer expires, the user equipment identifies data transferred from the PDSCH. If the unique identifier of the user equipment is included in the data, the user equipment determines that the random access procedure has been performed normally, and ends the random access procedure.

Beam Sweeping

As stated above, NR system should be able to use frequency bands up to 100 GHz. To compensate the increased path loss of higher frequency bands, the need for beam forming was identified.

Figure 6:
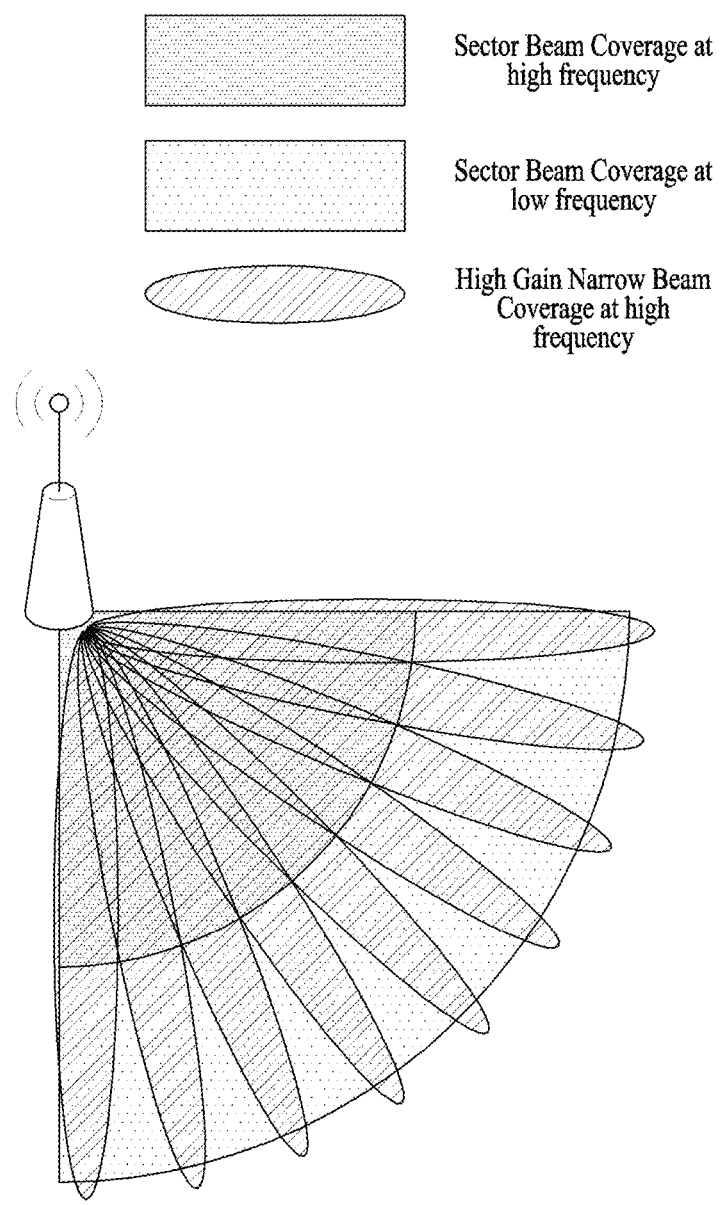
FIG. 6 shows the effect of higher frequencies on coverage and the compensation of path loss by using multiple narrow beams for downlink common channels.

FIG. 6 shows the effect of higher frequencies on coverage and the compensation of path loss by using multiple narrow beams for downlink common channels.

In lower frequency bands (e.g. current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that NR BS is able to form may be limited by the cost and complexity of the utilized transceiver architecture. In practice, on higher frequencies, the number of concurrent high gain beams is much less than the total number of beams required to cover the cell area. In other words, the NR BS is able to cover only part of the cell area by using a subset of beams at any given time.

Figure 7:
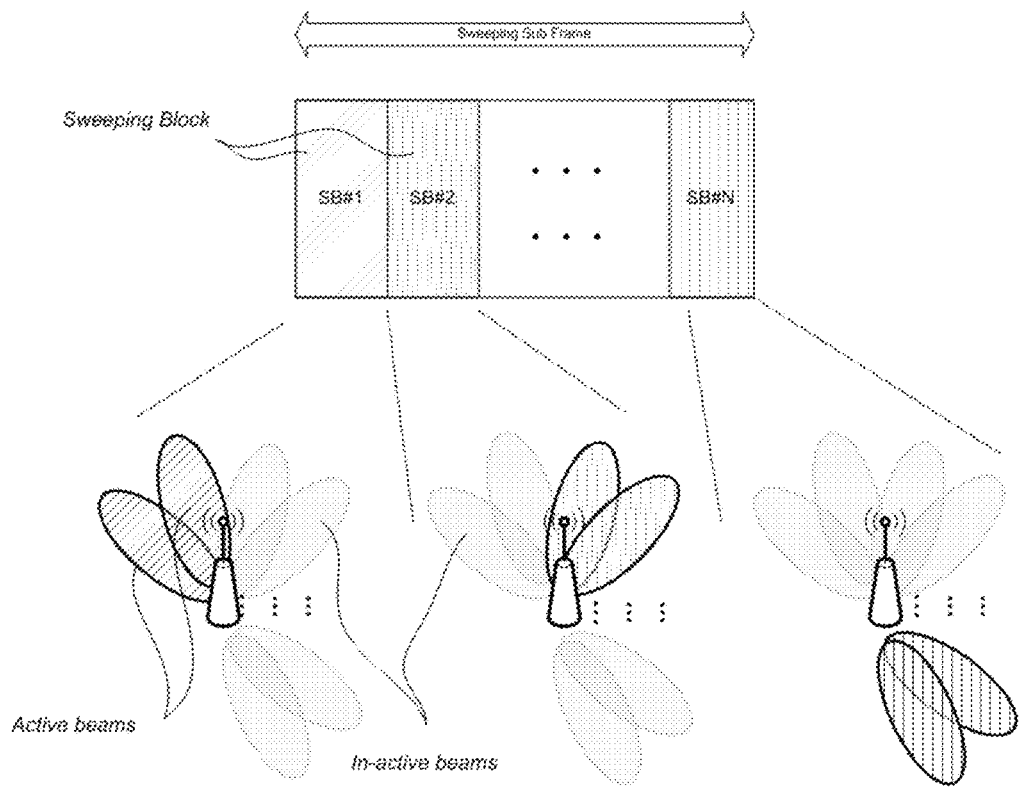
FIG. 7 shows the concept of beam sweeping according to one aspect of the present invention.

FIG. 7 shows the concept of beam sweeping according to one aspect of the present invention.

As shown in FIG. 7, NR BS needs to sweep through the cell coverage area in time domain by activating different set of beams at any given time. Thus for NR, a so-called sweeping subframe may be introduced to provide coverage for common control channel signaling periodically with beam forming. Sweeping subframe consists of sweeping blocks (SB) where a single block covers a specific area of the cell with a set of active high gain beams. Depending on the number of active beams per sweep block and the total number of beams required to cover a cell area, multiple sweep blocks may be needed as shown in FIG. 7.

The active beams in FIG. 7 could be used for either transmitting or receiving information thus the sweeping subframe can be defined as downlink or uplink sweeping subframe.

When using multiple narrow beams, it should be considered that some channels/signals need to be broadcasted in DL, e.g., System Information as well as Paging, and some channels/signals should be accessible/transmitted in UL for all UEs regardless of where the UE is located in a cell, e.g., RACH.

In order to support this common control information with multiple narrow beams in a cell, the above explained beam sweeping shall be used. Beam sweeping means that, in time domain, a gNB (refers NB in New RAT) sweeps the cell by using/activating different narrow beam. For example, at time point 1, the gNB uses/activates Beam #1 and at time point 2, the gNB uses/activates Beam #2, and so on.

As explained before, the use of beam sweeping in RACH would have an impact on RA procedure in terms of latency because the next opportunity to transmit RA preamble comes only after a certain time duration is passed.

On the other hand, transmitting RAP in every beam would increase signaling overhead from the UE point of view while it may also increase the collision probability of the RAP transmission between the UEs.

Thus, one embodiment of the present invention proposes a random access procedure to avoid both of the extremes.

Selection of Transmission Beam Among Predetermined Candidate Beams

Figure 8:
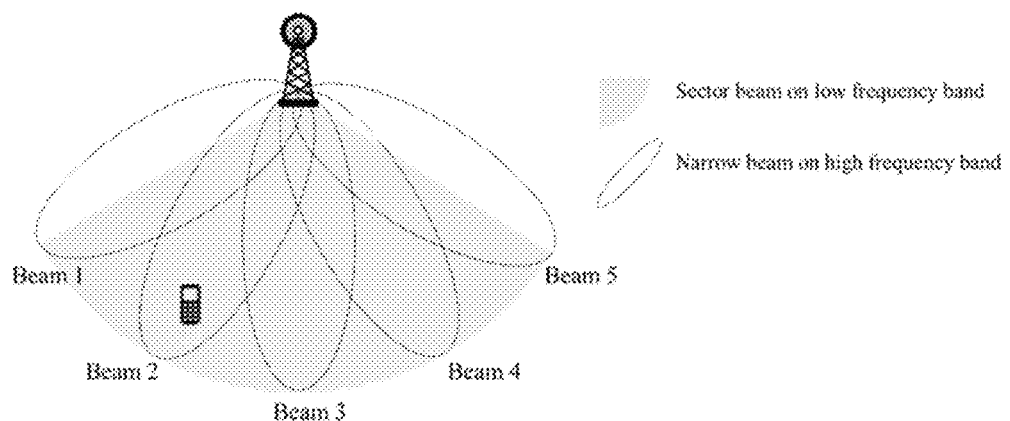
FIGS. 8-9 show an example for a random access procedure according to one embodiment of the present invention.
Figure 9:
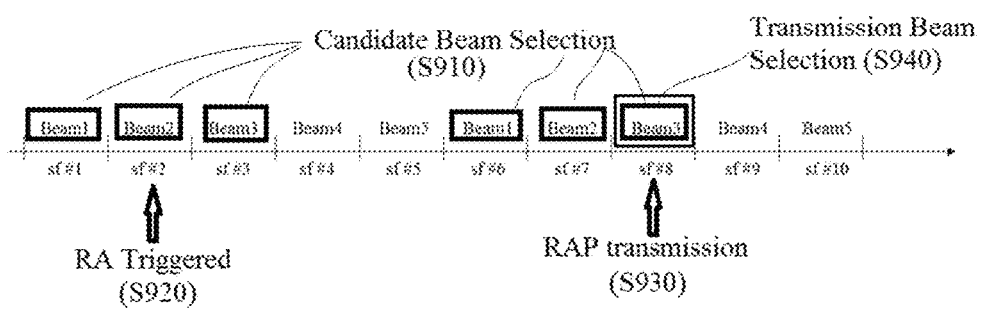

FIGS. 8-9 show an example for a random access procedure according to one embodiment of the present invention.

In this example, the UE may determine a predetermined number of beams, as candidate beams for the random access to the network, among multiple beams (S910). Here, each of the multiple beams is allocated on different time domain units for beam sweeping as shown in FIG. 9. In FIG. 9, each beam is associated with a specific RACH resource. For example, Beam1, Beam2, Beam3, Beam4, and Beam5 are associated with RACH resource on subframe1/6/ . . . , subframe2/7/ . . . , subframe3/8/ . . . , subframe4/9/ . . . , and subframe5/10/ . . . , respectively.

The candidate beams can be selected from multiple beams based on beam quality. In the example of FIG. 8, the beam quality is decreasing in order of Beam2, Beam3, Beam1, Beam4, and Beam5. I.e., Beam2 has the best beam quality while Beam5 has the worst beam quality from the UE perspective. Thus, the UE may consider that Beam2 is a serving beam.

In this example, among 5 beams, the UE can consider 3 beams as candidate beams in decreasing order of beam quality, i.e., the UE determines that Beam1, Beam2, and Beam3 are candidate beams (S910).

Suppose the UE triggers a RA procedure on subframe2 (S920), and the UE is able to transmit a RAP from subframe8 due to 6 ms of processing time (S930).

In this embodiment, the UE may transmit the random access preamble over a transmission beam selected as one from the candidate beams to the network (S940). It would be preferred that UE selects the transmission beam as an earliest available candidate beam in a time domain after the random access is triggered.

In FIG. 9, the UE selects Beam3 as RAP TX beam because Beam3 can be used for transmitting a RAP at the earliest point in time domain among the candidate beams, i.e., subframe8. The UE may use a PRACH resource associated with the selected transmission beam (e.g. beam 3). The UE transmits the RAP on subframe8 by using Beam3.

Generally speaking, in order to transmit a random access preamble, a UE may determine a certain number of beams over which the UE is allowed to transmit a random access preamble, i.e., this is called as candidate beams. The UE can determine the candidate beams based on beam quality, randomly, or any other specific conditions. After determining the candidate beams, the UE transmits a random access preamble over a beam which is selected among the candidate beams, where the selected beam, i.e., RAP TX beam, is a part of candidate beams or all candidate beams.

In this embodiment, a beam refers a transmitting beam over which the UE transmits data to a network, e.g., gNB, or a receiving beam over which the UE receives data from the network.

It is assumed that prior to initiating a random access (RA) procedure, the UE is aware of a serving beam. A serving beam refers the best beam among the beams that the UE uses in terms of e.g., signal strength. For example, based on the broadcasted synchronization signals such as PSS/SSS which is to be transmitted by using beam-forming or during Beam Management procedure, the UE can know the best receiving beam from the UE point of view. Then, due to the channel reciprocity between downlink and uplink, the UE is able to know the best transmitting beam from the UE point of view.

The UE can transmit/receive data to/from the gNB on different points in time domain by using different beams. In other words, there is a mapping between uplink resource and transmitting beam, or downlink resource and receiving beam. Here, resource refers a symbol, a slot, a subframe, a resource element, or a resource block.

Prior to initiating a random access (RA) procedure or transmitting a random access preamble (RAP), the UE determines candidate beams, where the candidate beams refers at least one beam over which the UE can transmit a RAP to the gNB:

The UE selects a certain number of beams in decreasing order of beam quality in terms of e.g., signal strength; or The certain number is configured by the network or pre-defined, e.g., 1, 2, or 3.

The UE selects a certain number of beams randomly; or

The UE selects all beams as candidate beams; or

The candidate beams may include the serving beam.

A UE initiates a RA procedure due to an event including,

The UE is to make an RRC Connection while the UE is currently in IDLE state, i.e., the UE is not in CONNECTED state; or The UE has data to transmit but the UE has no uplink resources; or The UE has data to transmit but the UE is not in uplink synchronized.

If the UE initiates the RA procedure, the UE selects a random access resource including a transmitting beam over which the UE transmits a RAP to a gNB, which is so called a RAP TX Beam. The UE selects at least one RAP TX beam as follows:

The UE selects all candidate beams; or

Among all candidate beams, the UE selects one beam that can be used at the earliest point in time domain; or For example, the earliest point in time domain may occur after a certain time is passed since the UE initiates the RA procedure by considering e.g., the UE processing time.

Among all candidate beams, the UE selects one random beam; or

Among all candidate beams, The UE selects a beam that has best quality in terms of e.g., signal strength.

After the UE selects the RAP TX beam, the UE transmits a RAP to the gNB over the selected RAP TX beam. Transmitting a RAP over the selected RAP TX beam means that the UE transmits the RAP to the gNB on a RACH resource which is associated with the selected RAP TX beam. For example, there can be a mapping between a RACH resource and a RAP TX beam. In case the UE selects multiple RAP TX beams, the UE may transmit different RAPs on different RAP TX beams or the UE may repeat transmitting the same RAP on different RAP TX beams.

After the UE transmits the RAP to the gNB over the selected RAP TX Beam, if the RA procedure fails, the UE retries transmitting a RAP by selecting at least one RAP TX beam as follows:

The UE selects all candidate beams; or

Among all candidate beams, the UE selects one beam that can be used for transmitting a RAP at the earliest point in time domain. For example, the earliest point in time domain may occur after a certain time is passed since the UE initiates the RA procedure by considering e.g., the UE processing time;

Among all candidate beams, the UE selects one random beam; or

Among all candidate beams, The UE selects a beam that has best quality in terms of e.g., signal strength.

After the UE selects the RAP TX Beam, the UE transmits a RAP to the gNB over the selected RAP TX Beam. I.e., the UE transmits the RAP to the gNB on a Physical RACH resource of a subframe which is associated with the selected RAP TX Beam.

In case the UE selects multiple RAP TX Beams, the UE may transmit different RAPs on different RAP TX Beams or the UE may repeat transmitting the same RAP on different RAP TX Beams.

Figure 10:
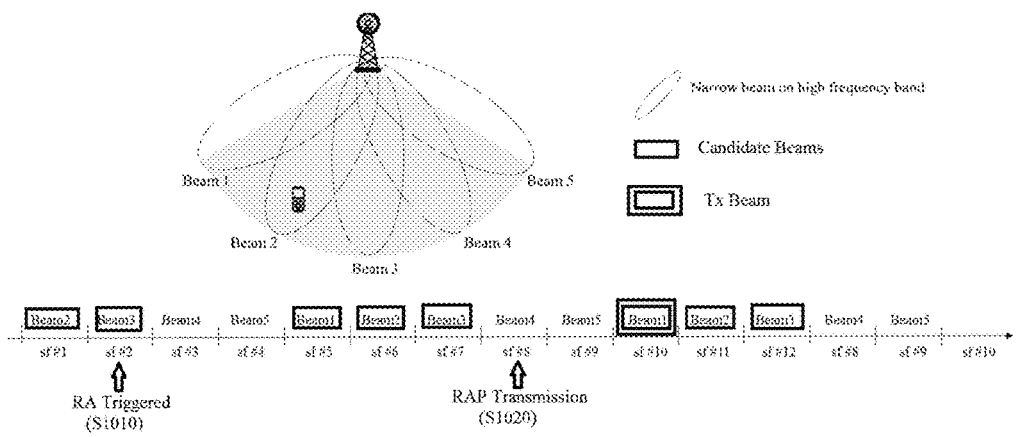
FIG. 10 shows another example of random access procedure of one embodiment of the present invention.

FIG. 10 shows another example of random access procedure of one embodiment of the present invention.

As like in FIG. 9, each beam is associated with a specific RACH resource. For example, Beam1, Beam2, Beam3, Beam4, and Beam5 are associated with RACH resource on subframe5/10/ . . . , subframe1/6/11/ . . . , subframe-2/7/12 . . . , subframe3/8/ . . . , and subframe4/9/ . . . , respectively.

The beam quality is decreasing in order of Beam2, Beam3, Beam1, Beam4, and Beam5. I.e., Beam2 has the best beam quality while Beam5 has the worst beam quality from the UE perspective. Thus, the UE considers that Beam2 is a serving beam. Among 5 beams, the UE is to consider 3 beams as candidate beams in decreasing order of beam quality, i.e., the UE determines that Beam1, Beam2, and Beam3 are candidate beams.

In FIG. 10, the UE triggers a RA procedure on subframe2 (S1010), and the UE is able to transmit a RAP from subframe8 due to 6 ms of processing time (S1020).

In this case, the UE can select Beam1 as RAP TX beam because Beam1 can be used for transmitting a RAP at the earliest point in time domain among the candidate beams, i.e., subframe10. So, the UE transmits a RAP on subframe10 by using Beam1.

Apparatus for Candidate Beams Based Random Access

Figure 11:
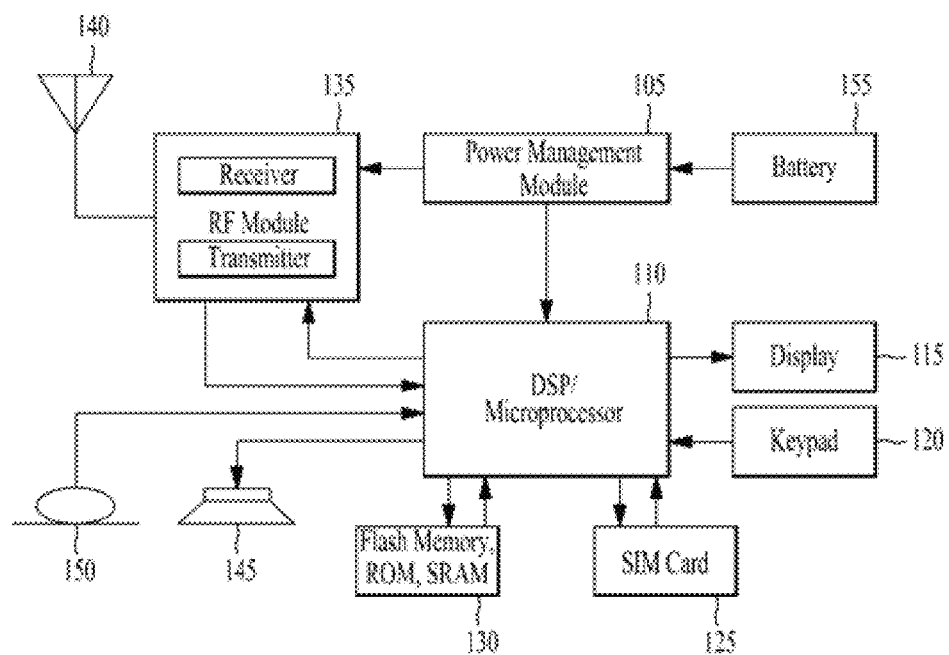
FIG. 11 is a block diagram of a communication apparatus according to an embodiment of the present invention.

FIG. 11 is a block diagram of a communication apparatus according to an embodiment of the present invention.

The apparatus shown in FIG. 11 can be a user equipment (UE) and/or eNB adapted to perform the above mechanism, but it can be any apparatus for performing the same operation.

As shown in FIG. 11, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 11 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described method has been described centering on an example applied to the 3GPP system, the present invention is applicable to a variety of wireless communication systems, e.g. IEEE system, in addition to the 3GPP system.

What is claimed is:

1. A method for a user equipment (UE) performing random access to a network, the method performed by the UE and comprising:
   determining a predetermined number of downlink beams as candidate beams for the random access to the network by the UE;
   selecting a beam among the determined candidate beams based on a reception quality of the beam;
   after a random access is triggered, determining a next available random access preamble transmitting occasion for transmitting a random access preamble from among plural random access preamble transmitting occasions that correspond to the selected beam and that occur after the random access is triggered, the next available random access preamble transmitting occasion determined in consideration of a processing time of the UE, each of the plural random access preamble transmitting occasions being matched with a corresponding one of the candidate beams; and
   transmitting the random access preamble on the determined next available random access preamble transmitting occasion.

2. The method of claim 1, wherein, if a first random access procedure initiated by transmitting the random access preamble fails, the UE reselects another transmission beam from the candidate beams.

3. The method of claim 2, wherein the UE reselects the another transmission beam as an earliest available candidate beam in time domain after a retransmission of the random access is triggered.

4. The method of claim 1,
   wherein the candidate beams are selected from multiple beams, and
   wherein each of the multiple beams is associated with different random access preamble transmitting occasions for a beam sweeping.

5. A user equipment (UE) performing random access to a network, the UE comprising:
   a processor configured to:
      determine a predetermined number of downlink beams as candidate beams for the random access to the network by the UE,
      select a beam among the determined candidate beams based on a downlink reception quality of the beam, and
      after a random access is triggered, determine a next available random access preamble transmitting occasion for transmitting a random access preamble from among plural random access preamble transmitting occasions that correspond to the selected beam and that occur after the random access is triggered, the next available random access preamble transmitting occasion determined in consideration of a processing time of the UE, each of the plural random access preamble transmitting occasions being matched with a corresponding one of the candidate beams; and
   a transceiver connected to the processor and configured to transmit the random access preamble on the determined next available random access preamble transmitting occasion.

6. The UE of claim 5, wherein, if a first random access procedure initiated by transmitting the random access preamble fails, the processor reselects another transmission beam from the candidate beams.

7. The UE of claim 6, wherein the processor reselects the another transmission beam as an earliest available candidate beam in time domain after a retransmission of the random access is triggered.

8. The UE of claim 5,
   wherein the candidate beams are selected from multiple beams, and
   wherein each of the multiple beams is associated with different random access preamble transmitting occasions for a beam sweeping.

* * * * *